United States Patent
Yagi et al.

(10) Patent No.: US 12,319,036 B2
(45) Date of Patent: *Jun. 3, 2025

(54) COMPOSITE LAMINATE AND METHOD FOR PRODUCING SAME

(71) Applicant: OTSUKA CHEMICAL CO., LTD., Osaka (JP)

(72) Inventors: Hiroshi Yagi, Tokushima (JP); Takashi Kitajima, Tokushima (JP); Kousuke Inada, Tokyo (JP)

(73) Assignee: OTSUKA CHEMICAL CO., LTD., Osaka (JP)

(*) Notice: Subject to any disclaimer, the term of this patent is extended or adjusted under 35 U.S.C. 154(b) by 621 days.

This patent is subject to a terminal disclaimer.

(21) Appl. No.: 17/606,501

(22) PCT Filed: May 7, 2020

(86) PCT No.: PCT/JP2020/018511
§ 371 (c)(1),
(2) Date: Oct. 26, 2021

(87) PCT Pub. No.: WO2020/235344
PCT Pub. Date: Nov. 26, 2020

(65) Prior Publication Data
US 2022/0203663 A1    Jun. 30, 2022

(30) Foreign Application Priority Data

May 17, 2019  (JP) .................................. 2019-093349
Sep. 18, 2019  (JP) .................................. 2019-169013

(51) Int. Cl.
B32B 27/20  (2006.01)
B29C 70/00  (2006.01)
(Continued)

(52) U.S. Cl.
CPC ............ *B32B 27/20* (2013.01); *B29C 70/003* (2021.05); *B32B 5/022* (2013.01); *B32B 5/266* (2021.05);
(Continued)

(58) Field of Classification Search
CPC . B32B 27/20; B32B 2250/02; B32B 2250/03; B32B 2250/40; B32B 2260/202;
(Continued)

(56) References Cited

U.S. PATENT DOCUMENTS 11,491,759 B2 * 11/2022  Yagi ........................ B32B 19/02
2010/0009158 A1    1/2010  Imaizumi et al.
(Continued)

FOREIGN PATENT DOCUMENTS

CN    101454132 A    6/2009
CN    101501114 A    8/2009
(Continued)

OTHER PUBLICATIONS

Machine translation of CN106626662A, published May 2017, Powered by EPO and Google. (Year: 2017).*
(Continued)

*Primary Examiner* — Monique R Jackson
(74) *Attorney, Agent, or Firm* — WHDA, LLP

(57) ABSTRACT

Provided is a composite laminate having excellent releasability from a mold during a production process, excellent surface appearance (surface smoothness) and mechanophysical properties, and excellent workability and coating adhesion. A composite laminate 1 includes an A layer 2 and a B layer 3, wherein the A layer 2 is provided directly or indirectly on one or both sides of the B layer 3, the A layer 2 contains reinforcing fibers (a1) with an average fiber length of 1 μm to 300 μm, spherical particles (a11) with a volume mean particle diameter of 0.01 μm to 100 μm, and
(Continued)

a thermoplastic resin (a2), and the B layer 3 contains reinforcing fibers (b1) with an average fiber length of 1 mm or more and a thermoplastic resin (b2).

11 Claims, 1 Drawing Sheet

(51) Int. Cl.
*B32B 5/02* (2006.01)
*B32B 5/26* (2006.01)
*B32B 27/12* (2006.01)
*B32B 27/34* (2006.01)

(52) U.S. Cl.
CPC .............. *B32B 27/12* (2013.01); *B32B 27/34* (2013.01); *B32B 2260/021* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2264/101* (2013.01); *B32B 2264/1021* (2020.08); *B32B 2264/1023* (2020.08); *B32B 2264/302* (2020.08); *B32B 2264/303* (2020.08); *B32B 2307/732* (2013.01); *B32B 2457/00* (2013.01); *B32B 2605/00* (2013.01)

(58) Field of Classification Search
CPC ..... B32B 5/02; B32B 27/12; B32B 2264/204; B32B 2264/202; B32B 2264/2032; B32B 2264/102; B32B 2264/1021; B32B 2264/1023
See application file for complete search history.

(56) References Cited

U.S. PATENT DOCUMENTS

| | | | |
|---|---|---|---|
| 2010/0178487 | A1 | 7/2010 | Arai et al. |
| 2011/0143110 | A1 | 6/2011 | Tsuchiya et al. |
| 2011/0147674 | A1 | 6/2011 | Arai et al. |
| 2011/0151235 | A1 | 6/2011 | Arai et al. |
| 2011/0287246 | A1 | 11/2011 | Arai et al. |
| 2011/0291056 | A1 | 12/2011 | Arai et al. |
| 2012/0012263 | A1 | 1/2012 | Tsuchiya et al. |
| 2012/0058297 | A1 | 3/2012 | Arai et al. |
| 2015/0274911 | A1 | 10/2015 | Suzuki et al. |
| 2015/0368857 | A1 | 12/2015 | Arai et al. |
| 2016/0023433 | A1 | 1/2016 | Langone et al. |
| 2017/0001336 | A1 | 1/2017 | Tamai et al. |
| 2019/0177510 | A1 | 6/2019 | Inada et al. |
| 2019/0276617 | A1* | 9/2019 | Kia .............................. C08J 5/04 |
| 2020/0331233 | A1 | 10/2020 | Yagi et al. |
| 2021/0009783 | A1* | 1/2021 | Fujioka ................... B29C 70/12 |
| 2021/0115226 | A1 | 4/2021 | Inada et al. |
| 2021/0206947 | A1 | 7/2021 | Inada et al. |

FOREIGN PATENT DOCUMENTS

| | | | | |
|---|---|---|---|---|
| CN | 102838766 | A | | 12/2012 |
| CN | 103396577 | A | | 11/2013 |
| CN | 105164192 | A | | 12/2015 |
| CN | 105882076 | A | | 8/2016 |
| CN | 106626662 | A | * | 5/2017 ....... B29C 45/14508 |
| CN | 109642082 | A | | 4/2019 |
| EP | 2902435 | A1 | | 8/2015 |
| GB | 1547280 | A | * | 6/1979 ............. B29C 70/00 |
| JP | 04232047 | A | * | 8/1992 |
| JP | H6-134881 | A | | 5/1994 |
| JP | 8-283494 | A | | 10/1996 |
| JP | H9-291210 | A | | 11/1997 |
| JP | H11-502788 | A | | 3/1999 |
| JP | 2000-26505 | A | | 1/2000 |
| JP | 2009-286817 | A | | 12/2009 |
| JP | 2010-235779 | A | | 10/2010 |
| JP | 2012-77223 | A | | 4/2012 |
| JP | 2012-81741 | A | | 4/2012 |
| JP | 2012-188670 | A | | 10/2012 |
| JP | 2015-51629 | A | | 3/2015 |
| JP | 2015-81321 | A | | 4/2015 |
| JP | 2015-127141 | A | | 7/2015 |
| JP | 2015-128873 | A | | 7/2015 |
| JP | 2016-37598 | A | | 3/2016 |
| JP | 2016-94608 | A | | 5/2016 |
| JP | 2016-97558 | A | | 5/2016 |
| JP | 2016-107485 | A | | 6/2016 |
| JP | 2017-114107 | A | | 6/2017 |
| KR | 2016-0115919 | A | | 10/2016 |
| WO | 96/30088 | A1 | | 10/1996 |
| WO | 2015/080019 | A1 | | 6/2015 |
| WO | 2018/181849 | A1 | | 10/2018 |
| WO | 2019/111737 | A1 | | 6/2019 |

OTHER PUBLICATIONS

Machine translation of JPH04232047A, published Aug. 1992, Powered by EPO and Google.. (Year: 1992).*
International Search Report dated Jul. 7, 2020, issued in counterpart International Application No. PCT/JP2020/018511 (3 pages).
Extended (Supplementary) European Search Report dated May 30, 2023, issued in counterpart EP application No. 20810664.1. (6 pages).
Office Action dated Sep. 26, 2023, issued in counterpart TW Application No. 109116068. (4 pages).
Notification of Transmittal of Translation of the International Preliminary Report on Patentability (Form PCT/IB/338) issued in counterpart International application No. PCT/JP2020/018511 mailed Dec. 2, 2021 with Forms PCT/IB/373 and PCT/ISA/237. (7 pages).
Office Action dated Jul. 28, 2023, issued in counterpart CN application No. 202080030209.6. (10 pages).
International Search Report dated Jul. 7, 2020, issued in International Application No. PCT/JP2020/018510 (counterpart to U.S. Appl. No. 17/606,491). (3 pages).
Notification of Transmittal of Translation of the International Preliminary Report on Patentability (Form PCT/IB/338) issued in International application No. PCT/JP2020/018510 mailed Dec. 2, 2021 with Forms PCT/IB/373 and PCT/ISA/237 (counterpart to U.S. Appl. No. 17/606,491). (8 pages).
Extended (Supplementary) European Search Report dated May 26, 2023, issued in EP Application No. 20809394.8 (counterpart to U.S. Appl. No. 17/606,491). (8 pages).
Office Action dated Jul. 27, 2023, issued in CN Application No. 202080029988.8 (counterpart to U.S. Appl. No. 17/606,491). (10 pages).
Office Action dated Sep. 19, 2023, issued in TW Application No. 109116016 (counterpart to U.S. Appl. No. 17/606,491). (7 pages).
Office Action dated Mar. 19, 2024, issued in JP Application No. 2021-520694 (counterpart to U.S. Appl. No. 17/606,491). (3 pages).
Non-Final Office Action dated Mar. 20, 2024, issued in U.S. Appl. No. 17/606,491. (39 pages).
3M Glass Bubbles K Series, S Series and iM Seris, Product Information, 2013, 3M Center, retrieved from <URL:http://multimedia.3m.com/mws/media/910490/3m-glass-bubbles-k-s-and-im-series.pfd?&fn=GlassMicrospheresKSiM16K_Seris_DMR_9838591_R3.pdf>. (4 pages).
Office Action dated Jan. 22, 2025, issued in counterpart KR Application No. 10-2021-7033706. (6 pages).

* cited by examiner

[FIG. 1.]
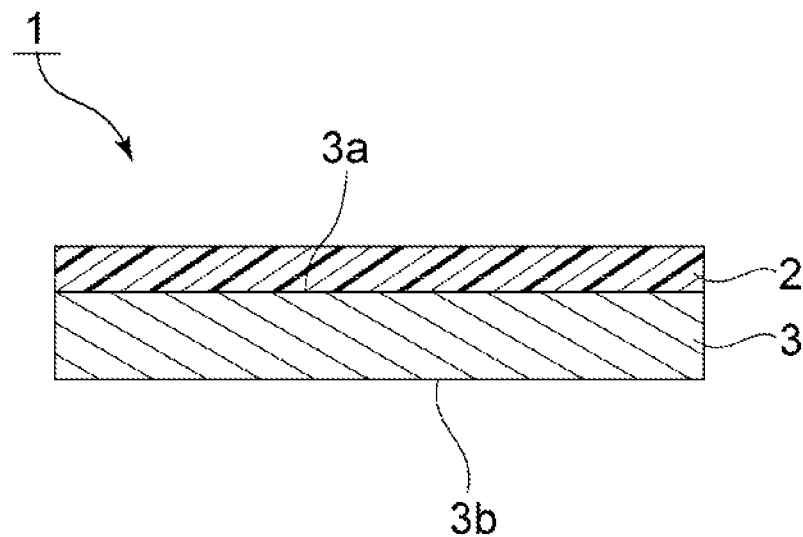
[FIG. 2.]
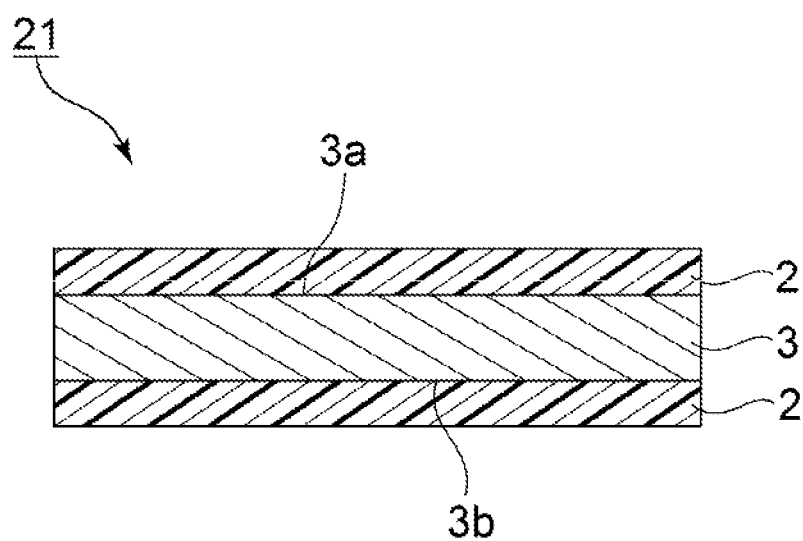

COMPOSITE LAMINATE AND METHOD FOR PRODUCING SAME

TECHNICAL FIELD

The present invention relates to fiber-reinforced composite laminates and methods for producing the composite laminates.

BACKGROUND ART

Fiber-reinforced resin is lightweight and strong and is therefore used as a material to replace metal in various fields, including golf clubs, tennis rackets, aircraft, and motor vehicles. Particularly, because of recent demands for weight saving of vehicles to achieve low fuel consumption, fiber-reinforced resin has attracted attention in the motor vehicle field. However, there are various problems to be solved in order to use fiber-reinforced resin for motor vehicle members. For example, fiber-reinforced resin made of thermosetting resin needs to be thermally treated (undergo a curing reaction) after being molded, which prevents achievement of high productivity and low cost essential for the production of motor vehicle members. Therefore, there are demands for fiber-reinforced thermoplastic resin (hereinafter, referred to also as "FRTP") in which thermoplastic resin, which is easily moldable, is used in place of thermosetting resin.

As a method for molding FRTP, stamping molding is commonly performed in which sheets made of continuous fibers impregnated with a thermoplastic resin are stacked one upon another and heat and pressure are applied to the stack with a press or the like to give the stack a desired shape. Because of the use of continuous fibers, members obtained in this manner can be designed to have good mechano-physical properties and can exhibit less variations in mechano-physical properties. However, because the fibers used are continuous fibers, FRTP is difficult to form into a complicated shape, such as a three-dimensional shape, and is limited mainly to the use for members having a flat shape or shapes like that. To cope with this, Patent Literature 1 proposes that, by making incisions in prepregs made of continuous fibers and a thermoplastic resin, the prepregs can be molded in a short time, exhibit good shapability during molding, and can develop good mechano-physical properties when produced as an FRTP member. Patent Literature 2 proposes the use of prepregs containing non-continuous fibers and thermoplastic fibers (what is called prepreg is a semi-cured, sheet-shaped preform material made of continuous or non-continuous reinforced fibers impregnated with a thermosetting resin or a thermoplastic resin). However, in Patent Literatures 1 and 2, there arises a problem that when prepregs are stacked to produce an FRTP, a layered base material sticks to a belt or a mold of a molding machine, which prevents stable production of an FRTP member.

The use of a mold release agent is known as a method for preventing the sticking of material to a mold of a molding machine, but the transfer of the mold release agent to the surface of an FRTP member may deteriorate the surface quality (cause poor appearance) of the FRTP member. To avoid this, a release film may be used. However, the use of a release film interferes with heat conduction from the heated or cooled mold to the layered base material. If the heat conduction from the mold to the layered base material is interfered with, melting or solidification by cooling of the thermoplastic resin becomes insufficient, so that the resultant FRTP member has low mechano-physical properties, including strength and rigidity. If, in order to solve this problem, the temperature of the mold is excessively increased or decreased, the mold repeats contraction and expansion and, in turn, may be damaged. Then, an FRTP member having good surface appearance and excellent quality cannot stably be produced.

FRTP members for motor vehicle exterior parts are members depending largely on visual impressions and feelings of users and, therefore, an FRTP member having a poor surface quality significantly reduces its commercial value. For this reason, FRTP members for motor vehicle exterior parts are required to have not only good mechano-physical properties and moldability but also good surface appearance. As solutions, Patent Literature 3 proposes to limit the thickness of a release film to not more than 10 times the thickness of a prepreg or use plates treated with a mold release agent.

CITATION LIST

Patent Literature

Patent Literature 1: JP-A-2009-286817
Patent Literature 2: JP-A-2010-235779
Patent Literature 3: JP-A-2015-51629

SUMMARY OF INVENTION

Technical Problem

However, Patent Literature 3 does not propose any technique for stably producing an FRTP member having good surface appearance and good quality, without a technique of using a release film or the like. Furthermore, Patent Literature 3 does not also propose any method for simultaneously increasing the mechano-physical properties, including strength and rigidity, workability, and coating adhesion of an FRTP member.

An object of the present invention is to provide: a composite laminate having excellent releasability from a mold during a production process, excellent surface appearance (surface smoothness) and mechano-physical properties, and excellent workability and coating adhesion; and a method for producing the composite laminate.

Solution to Problem

The present invention provides the following composite laminate and method for producing the same.

Aspect 1: A composite laminate including an A layer and a B layer, the A layer being provided directly or indirectly on one or both sides of the B layer, the A layer containing reinforcing fibers (a1) with an average fiber length of 1 μm to 300 μm, spherical particles (a11) with a volume mean particle diameter of 0.01 μm to 100 μm, and a thermoplastic resin (a2), the B layer containing reinforcing fibers (b1) with an average fiber length of 1 mm or more and a thermoplastic resin (b2).

Aspect 2: The composite laminate according to aspect 1, wherein the reinforcing fibers (a1) are at least one of potassium titanate and wollastonite.

Aspect 3: The composite laminate according to aspect 1 or 2, wherein the spherical particles (a11) are at least one material selected from the group consisting of silica, alumina, and glass beads.

Aspect 4: The composite laminate according to any one of aspects 1 to 3, wherein the thermoplastic resin (a2) is at least one selected from the group consisting of polyolefin resin, polystyrene-based resin, polyester-based resin, aliphatic polyamide resin, semi-aromatic polyamide resin, polyphenylene sulfide resin, polyether sulfone resin, aromatic polyether ketone resin, polyetherimide resin, and thermoplastic polyimide resin.

Aspect 5: The composite laminate according to any one of aspects 1 to 4, wherein a content of the reinforcing fibers (a1) is 0.5% by mass to 30% by mass in a total amount of 100% by mass of all components contained in the A layer.

Aspect 6: The composite laminate according to any one of aspects 1 to 5, wherein a content of the spherical particles (a11) is 0.5% by mass to 20% by mass in a total amount of 100% by mass of all components contained in the A layer.

Aspect 7: The composite laminate according to any one of aspects 1 to 6, wherein the A layer has a thickness of less than 500 μm.

Aspect 8: The composite laminate according to any one of aspects 1 to 7, wherein the reinforcing fibers (b1) are at least one type of fibers selected from the group consisting of carbon fibers, glass fibers, and aramid fibers.

Aspect 9: The composite laminate according to any one of aspects 1 to 8, wherein a content of the reinforcing fibers (b1) is 10% by mass to 80% by mass in a total amount of 100% by mass of all components contained in the B layer.

Aspect 10: The composite laminate according to any one of aspects 1 to 9, wherein the thermoplastic resin (b2) is at least one selected from the group consisting of polyolefin resin, polystyrene-based resin, polyester-based resin, aliphatic polyamide resin, semi-aromatic polyamide resin, polyphenylene sulfide resin, polyether sulfone resin, aromatic polyether ketone resin, polyetherimide resin, and thermoplastic polyimide resin.

Aspect 11: The composite laminate according to any one of aspects 1 to 10, wherein the B layer has a thickness of 0.3 mm or more.

Aspect 12: The composite laminate according to any one of aspects 1 to 11, being used for motor vehicle members or electric and electronic components.

Aspect 13: A method for producing the composite laminate according to any one of aspects 1 to 12, the method including: disposing a film (a3) containing reinforcing fibers (a1) with an average fiber length of 1 μm to 300 μm, spherical particles (a11) with a volume mean particle diameter of 0.01 μm to 100 μm, and a thermoplastic resin (a2) on one or both sides of a sheet (b3) containing reinforcing fibers (b1) with an average fiber length of 1 mm or more and a thermoplastic resin (b2) to form a layered stack of the film (a3) and the sheet (b3); and applying heat and pressure to the layered stack to integrate the sheet (b3) and the film (a3).

Advantageous Effects of Invention

The present invention enables provision of: a composite laminate having excellent releasability from a mold during a production process, excellent surface appearance (surface smoothness) and mechano-physical properties, and excellent workability and coating adhesion; and a method for producing the composite laminate.

BRIEF DESCRIPTION OF DRAWINGS

FIG. 1 is a schematic cross-sectional view showing a composite laminate according to a first embodiment of the present invention.

FIG. 2 is a schematic cross-sectional view showing a composite laminate according to a second embodiment of the present invention.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference numerals.

A composite laminate according to the present invention includes an A layer and a B layer, wherein the A layer is provided directly or indirectly on one or both sides of the B layer. The A layer is preferably provided directly on one or both sides of the B layer. However, the A layer may be provided through another layer on one or both sides of the B layer. In this case, it is sufficient that the other layer is a layer different from the A layer and the B layer.

The A layer contains: reinforcing fibers (a1) having an average fiber length of 1 μm to 300 μm; spherical particles (a11) having a volume mean particle diameter of 0.01 μm to 100 μm; and a thermoplastic resin (a2). On the other hand, the B layer contains: reinforcing fibers (b1) having an average fiber length of 1 mm or more; and a thermoplastic resin (b2).

More specifically, FIG. 1 is a schematic cross-sectional view showing a composite laminate according to a first embodiment of the present invention. As shown in FIG. 1, the composite laminate 1 includes an A layer 2 as a first layer and a B layer 3 as a second layer. The B layer 3 has a first principal surface 3a and a second principal surface 3b opposed to each other. The A layer 2 is provided on the first principal surface 3a of the B layer 3. The A layer 2 is formed of a film (a3) containing: the reinforcing fibers (a1); the spherical particles (a11), and the thermoplastic resin (a2). The B layer 3 is formed of a sheet (b3) containing: the reinforcing fibers (b1); and the thermoplastic resin (b2). The film (a3) and the sheet (b3) are integrated together. Specifically, for example, as explained in a production method to be described hereinafter, they are integrated together by disposing the film (a3) on one or both sides of the sheet (b3) to form a layered stack of the film (a3) and the sheet (b3) and applying heat and pressure to the layered stack.

FIG. 2 is a schematic cross-sectional view showing a composite laminate according to a second embodiment of the present invention. As shown in FIG. 2, in the composite laminate 21, an A layer 2 is further provided on the second principal surface 3b of the B layer 3. As for the rest, the second embodiment is designed in the same way as the first embodiment.

As shown in the first embodiment and the second embodiment, in the composite laminate according to the present invention, the A layer may be provided only on one side of the B layer or may be provided on both sides of the B layer.

A description will be given below of components and so on of the composite laminate according to the present invention.

<A Layer>

The A layer being a component of the composite laminate according to the present invention is formed of a film (a3) containing: reinforcing fibers (a1) having an average fiber length of 1 μm to 300 μm; spherical particles (a11) having a volume mean particle diameter of 0.01 μm to 100 μm; and a thermoplastic resin (a2). The A layer exists on one or both sides of the B layer to be described hereinafter. Since the A layer exists as a front layer, a back layer or front and back layers of the composite laminate, the composite laminate has excellent mold releasability during molding, excellent surface smoothness and mechano-physical properties, and excellent workability and coating adhesion.

The thickness of the A layer is preferably smaller than the thickness of the B layer, more preferably less than 500 μm, still more preferably 30 μm to 450 μm, particularly preferably 50 μm to 300 μm, and most preferably 100 μm to 200 μm. If the thickness of the A layer is too large, the content of reinforcing fibers (b1) in the composite laminate decreases, so that the strength may decrease. In contrast, since the thickness of the A layer is smaller than the thickness of the B layer, the mechano-physical properties of the B layer can be maximized, so that a composite laminate having more excellent mechano-physical properties can be obtained. Note that the thickness of the A layer in the case where the A layers exist on both sides of the B layer refers to a total of the thicknesses of both the A layers.

The thickness ratio between the A layer and the B layer (A layer/B layer) is preferably not less than 0.01, more preferably not less than 0.05, preferably not more than 0.50, and more preferably not more than 0.30.

(Reinforcing Fibers (a1))

The reinforcing fibers (a1) for use in the A layer is a powder formed of fibrous particles and their average fiber length is 1 μm to 300 μm, preferably 1 μm to 200 μm, more preferably 3 μm to 100 μm, and still more preferably 5 μm to 50 μm.

The average aspect ratio of the reinforcing fibers (a1) is preferably 3 to 200, more preferably 3 to 100, still more preferably 5 to 50, and particularly preferably 10 to 40.

The reinforcing fibers (a1) for use in the present invention preferably have a Mohs hardness of 5 or less in view of sliding properties of the composite laminate and examples of such material include potassium titanate, wollastonite, aluminum borate, magnesium borate, xonotlite, zinc oxide, and basic magnesium sulfate. From the viewpoint of mechano-physical properties of them, the reinforcing fibers (a1) are preferably at least one of potassium titanate and wollastonite. The Mohs hardness is an index indicating the hardness of substances, wherein when two different minerals are rubbed against each other, scratched one of them is a substance having a lower hardness.

Heretofore known potassium titanates can be widely used and examples include potassium tetratitanate, potassium hexatitanate, and potassium octatitanate. There is no particular limitation as to the dimensions of potassium titanate so long as they are within the above-described ranges of dimensions of the reinforcing fibers (a1). However, its average fiber diameter is preferably 0.01 μm to 1 μm, more preferably 0.05 μm to 0.8 μm, and still more preferably 0.1 μm to 0.7 μm, its average fiber length is preferably 1 μm to 50 μm, more preferably 3 μm to 30 μm, and still more preferably 10 μm to 20 μm, and its average aspect ratio is preferably 10 or more, more preferably 10 to 100, and still more preferably 15 to 35. In the present invention, even marketed products can be used and examples that can be used include "TISMO D" (average fiber length: 15 μm, average fiber diameter: 0.5 μm) and "TISMO N" (average fiber length: 15 μm, average fiber diameter: 0.5 μm) both manufactured by Otsuka Chemical Co., Ltd.

Wollastonite is inorganic fibers made of calcium metasilicate. There is no particular limitation as to the dimensions of wollastonite so long as they are within the above-described ranges of dimensions of the reinforcing fibers. However, its average fiber diameter is preferably 0.1 μm to 15 μm, more preferably 1 μm to 10 μm, and still more preferably 2 μm to 7 μm, its average fiber length is preferably 3 μm to 180 μm, more preferably 10 μm to 100 μm, and still more preferably 20 μm to 40 μm, and its average aspect ratio is preferably 3 or more, more preferably 3 to 30, and still more preferably 5 to 15. In the present invention, even marketed products can be used and an example that can be used is "Bistal W" (average fiber length: 25 μm, average fiber diameter: 3 μm) manufactured by Otsuka Chemical Co., Ltd.

The above average fiber length and average fiber diameter can be measured by observation with a scanning electron microscope, and the average aspect ratio (average fiber length/average fiber diameter) can be calculated from the average fiber length and the average fiber diameter. For example, a plurality of reinforcing fibers (a1) are taken with a scanning electron microscope, the images of 300 reinforcing fibers (a1) are arbitrarily selected from the observed images of the plurality of reinforcing fibers, and their fiber lengths and fiber diameters are measured. The average fiber length can be determined by dividing the sum of all the measured fiber lengths by the number of fibers, and the average fiber diameter can be determined by dividing the sum of all the measured fiber diameters by the number of fibers.

Fibrous particles as used in the present invention means particles having an L/B of 3 or more and an L/T of 3 or more where a length L represents the dimension of the longest side of, among cuboids (circumscribing cuboids) circumscribing the particle, a cuboid having the minimum volume, a breadth B represents the dimension of the second longest side of the cuboid, and a thickness T (B>T) represents the dimension of the shortest side of the cuboid. The length L and the breadth B correspond to the fiber length and the fiber diameter, respectively. Non-fibrous particles are particles having an L/B smaller than 3 and platy particles are non-fibrous particles having an L/B smaller than 3 and an L/T of 3 or more.

Regarding the reinforcing fibers (a1), in order to increase the wettability with the thermoplastic resin (a2) and further improve physical properties, such as mechano-physical properties, of an obtained resin composition, treated layers made of a surface treatment agent may be formed on the surfaces of reinforcing fibers (a1) for use in the present invention.

Examples of the surface treatment agent include silane coupling agents and titanium coupling agents. Preferred among them are silane coupling agents and more preferred are aminosilane coupling agents, epoxysilane coupling agents, and alkylsilane coupling agents. These surface treatment agents may be used alone or as a mixture of two or more thereof.

Examples of the aminosilane coupling agents include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-ethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane.

Examples of the epoxysilane coupling agents include 3-glycidyloxypropyl(dimethoxy)methylsilane, 3-glycidyloxypropyltrimethoxysilane, diethoxy(3-glycidyloxypropyl)methylsilane, triethoxy(3-glycidyloxypropyl)silane, and 2-(3,4-epoxycyclohexyl)ethyltrimethoxysilane.

Examples of the alkylsilane coupling agents include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltriethoxysilane, n-hexyltrimethoxysilane, n-hexyltriethoxysilane, cyclohexylmethyldimethoxysilane, n-octyltriethoxysilane, and n-decyltrimethoxysilane.

Known surface treatment methods can be used as the method for forming treated layers made of a surface treatment agent on the surfaces of the reinforcing fibers (a1) and examples include: a wet method of dissolving the surface treatment agent in a solvent promoting hydrolysis (for example, water, an alcohol or a mixed solvent of them) to prepare a solution and spraying the solution on the reinforcing fibers (a1); and an integral blend method of blending the reinforcing fibers (a1) and the surface treatment agent with a resin composition.

There is no particular limitation as to the amount of surface treatment agent in treating the surfaces of the reinforcing fibers (a1) for use in the present invention with the surface treatment agent, but, in the case of the wet method, the solution of the surface treatment agent may be sprayed so that the amount of surface treatment agent reaches, for example, 0.1 parts by mass to 20 parts by mass relative to 100 parts by mass of reinforcing fibers (a1). On the other hand, in the case of the integral blend method, the surface treatment agent may be blended with the resin composition so that the amount of surface treatment agent reaches preferably 1 part by mass to 50 parts by mass and more preferably 10 parts by mass to 40 parts by mass, relative to 100 parts by mass of reinforcing fibers (a1). When the amount of surface treatment agent is within the above ranges, the adhesion of the reinforcing fibers (a1) to the thermoplastic resin (a2) can be further increased and the dispersibility of the reinforcing fibers (a1) can be further increased.

The content of the reinforcing fibers (a1) is, in a total amount of 100% by mass of all components contained in the film (a3), preferably 0.5% by mass to 30% by mass, more preferably 1% by mass to 20% by mass, and still more preferably 5% by mass to 15% by mass.

When the content of the reinforcing fibers (a1) is not less than 0.5% by mass, the mold releasability during molding and the surface smoothness, mechano-physical properties, and workability of the composite laminate can be further increased. When the content of the reinforcing fibers (a1) is not more than 30% by mass, the formability of a film to be described hereinafter can be further increased.

(Spherical Particles (a11))

Examples of the spherical particles (a11) for use in the film (a3) include silica, glass beads, glass balloons, alumina, calcium carbonate, and magnesium carbonate and the preferred spherical particles (a11) are at least one material selected from the group consisting of silica, alumina, and glass beads.

The term "spherical" herein includes not only a true spherical shape but also approximately spherical shapes, such as an oval spherical shape, and these spherical shapes with surface asperities. The aspect ratio (the ratio of the length to the breadth) of the spherical silica is, for example, preferably 2 or less and more preferably 1.5 or less. The aspect ratio can be determined as a value obtained by monitoring the shapes of arbitrary 50 particles with a scanning electron microscope (SEM) and averaging the aspect ratios of these particles.

Silica used herein not only refers to narrow defined silicon dioxide, but also to a silicate-based filler, and can be appropriately selected from among materials conventionally used as a filler for resin. However, it is preferably amorphous silica.

Examples of amorphous silica include dry silica (anhydrous silica) and wet silica (hydrous silicic acid). Dry silica can be obtained, for example, by a combustion method in which silicon tetrachloride is burned in a flame of oxygen and hydrogen. Wet silica can be obtained, for example, by a precipitation method or gel method in which sodium silicate is neutralized with an inorganic acid, or a sol-gel method in which alkoxysilane is hydrolyzed.

The volume mean particle diameter of the spherical particles (a11) is 0.01 µm to 100 µm, preferably 0.01 µm to 10 µm, more preferably 0.05 µm to 6 µm, still more preferably 0.1 µm to 4 µm, and particularly preferably 0.3 µm to 2 µm. By defining the volume mean particle diameter within the above range, the composite laminate can be increased in coating adhesion without decreasing its mechano-physical properties.

The volume mean particle diameter refers to, when a cumulative frequency distribution curve of particle diameters is determined with the total volume of the particles as 100%, a particle diameter at a point corresponding to a 50% cumulative volume. The cumulative frequency distribution curve can be measured, for example, with a particle size distribution measurement device using the laser diffraction and scattering method.

The specific surface area (by the BET method) of the spherical particles (a11) is preferably 1 $m^2/g$ to 30 $m^2/g$, more preferably 2 $m^2/g$ to 20 $m^2/g$, and still more preferably 3 $m^2/g$ to 10 $m^2/g$.

The specific surface area (by the BET method) can be measured in conformity with JIS Z8830. The BET method refers to a method in which nitrogen gas whose occupied area has already been known is adsorbed on the surface of a sample powder particle and the specific surface area of the sample powder particle is determined from the amount of nitrogen gas adsorbed thereon, and the specific surface area determined by this method is referred to as the "BET specific surface area".

Regarding the spherical particles (a11), in order to increase the wettability with the thermoplastic resin (a2) and further improve physical properties, such as mechano-physical properties, of an obtained resin composition, treated layers made of a surface treatment agent may be formed on the surfaces of spherical particles (a11) for use in the present invention.

Examples of the surface treatment agent include silane coupling agents and titanium coupling agents. Preferred among them are silane coupling agents and more preferred are aminosilane coupling agents, epoxysilane coupling agents, and alkylsilane coupling agents. These surface treatment agents may be used alone or as a mixture of two or more thereof.

Examples of the aminosilane coupling agents include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-ethoxysilyl-N-(1,3-dimethylbutylidene) propylamine, N-phenyl-3-aminopropyltrimethoxysilane, and N-(vinylbenzyl)-2-aminoethyl-3-aminopropyltrimethoxysilane.

Examples of the epoxysilane coupling agents include 3-glycidyloxypropyl(dimethoxy)methylsilane, 3-glycidyloxypropyltrimethoxysilane, diethoxy(3-glycidyloxypropyl)methylsilane, triethoxy(3-glycidyloxypropyl)silane, and 2-(3,4-epoxycyclohexyl)ethyltrimethoxysilane.

Examples of the alkylsilane coupling agents include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltriethoxysilane, n-hexyltrimethoxysilane, n-hexyltriethoxysilane, cyclohexylmethyldimethoxysilane, n-octyltriethoxysilane, and n-decyltrimethoxysilane.

Known surface treatment methods can be used as the method for forming treated layers made of a surface treatment agent on the surfaces of the spherical particles (a11) and examples include: a wet method of dissolving the surface treatment agent in a solvent promoting hydrolysis (for example, water, an alcohol or a mixed solvent of them) to prepare a solution and spraying the solution on the spherical particles (a11); and an integral blend method of blending the spherical particles (a11) and the surface treatment agent with a resin composition.

There is no particular limitation as to the amount of surface treatment agent in treating the surfaces of the spherical particles (a11) for use in the present invention with the surface treatment agent, but, in the case of the wet method, the solution of the surface treatment agent may be sprayed so that the amount of surface treatment agent reaches, for example, 0.1 parts by mass to 20 parts by mass relative to 100 parts by mass of spherical particles (a11). On the other hand, in the case of the integral blend method, the surface treatment agent may be blended with the resin composition so that the amount of surface treatment agent reaches preferably 1 part by mass to 50 parts by mass and more preferably 10 parts by mass to 40 parts by mass, relative to 100 parts by mass of spherical particles (a11). When the amount of surface treatment agent is within the above ranges, the adhesion of the spherical particles (a11) to the thermoplastic resin (a2) can be further increased and the dispersibility of the spherical particles (a11) can be further increased.

The content of the spherical particles (a11) is, in a total amount of 100% by mass of all components contained in the film (a3), preferably 0.5% by mass to 20% by mass, more preferably 1% by mass to 15% by mass, and still more preferably 3% by mass to 10% by mass.

When the content of the spherical particles (a11) is not less than 0.5% by mass, the composite laminate can be further increased in coating adhesions without decreasing its mechano-physical properties. When the content of the spherical particles (a11) is not more than 20% by mass, the formability of a film to be described hereinafter can be further increased.

(Thermoplastic Resin (a2))

There is no particular limitation as to the type of the thermoplastic resin (a2) for use in the film (a3) so long as it is a thermoplastic resin that can be formed into a film. Examples include: polyolefin resins, such as polypropylene (PP) resin, polyethylene (PE) resin, cyclic polyolefin (COP) resin, and cyclic olefin copolymer (COC) resin; polystyrene-based resins, such as polystyrene (PS) resin, syndiotactic polystyrene (SPS) resin, high-impact polystyrene (HIPS) resin, acrylonitrile-butylene-styrene copolymer (ABS) resin, methyl methacrylate-styrene copolymer (MS), methyl methacrylate-styrene-butadiene copolymer (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (SEBS), and styrene-ethylene-propylene-styrene copolymer (SEPS); polyester-based resins, such as polylactic (PLA) resin, polyethylene terephthalate (PET) resin, polybutylene terephthalate (PBT) resin, and polycyclohexylenedimethylene terephthalate (PCT) resin; polyacetal (POM) resin; polycarbonate (PC) resin; aliphatic polyamide (PA) resins, such as polyamide 6 resin, polyamide 66 resin, polyamide 11 resin, polyamide 12 resin, polyamide 46 resin, polyamide 6C resin, polyamide 9C resin, polyamide 6 resin-polyamide 66 resin copolymer (polyamide 6/66 resin), and polyamide 6 resin-polyamide 12 resin copolymer (polyamide 6/12 resin); semi-aromatic polyamide (PA) resins composed of a structural unit with an aromatic ring and a structural unit free from aromatic ring, such as polyamide MXD6 resin, polyamide MXD10 resin, polyamide 6T resin, polyamide 9T resin, and polyamide 10T resin; polyphenylene sulfide (PPS) resin; polyether sulfone (PES) resin; liquid crystal polyester (LCP) resin; aromatic polyether ketone resins, such as polyether ketone (PEK) resin, polyether ether ketone (PEEK) resin, polyether ketone ketone (PEKK) resin, and polyether ether ketone ketone (PEEKK) resin; polyether imide (PEI) resin; polyamide-imide (PAI) resin; thermoplastic polyimide (TPI) resin; and fluororesins, such as polyvinylidene fluoride (PVDF), polyvinyl fluoride (PVF), and ethylene-tetrafluoroethylene copolymer (ETFE). Mixtures of at least two compatible thermoplastic resins selected from among the above thermoplastic resins, i.e., polymer alloys, or the like can also be used.

Among them, the preferred thermoplastic resin (a2) is at least one selected from the group consisting of polyolefin resin, polystyrene-based resin, polyester-based resin, aliphatic polyamide (PA) resin, semi-aromatic polyamide (PA) resin, polyphenylene sulfide (PPS) resin, polyether sulfone (PES) resin, aromatic polyether ketone resin, polyether imide (PEI) resin, and thermoplastic polyimide (TPI) resin.

In view of further increasing the adhesion to the B layer, the thermoplastic resin (a2) is preferably of the same type as the thermoplastic resin (b2) to be described hereinafter. For example, when the thermoplastic resin (b2) is aliphatic polyamide (PA), the thermoplastic resin (a2) is preferably aliphatic polyamide (PA) resin or semi-aromatic polyamide (PA).

There is no particular limitation as to the form of the thermoplastic resin (a2) so long as it can be melt-kneaded. For example, any one of powdered, granular, and pelletized forms can be used.

The content of the thermoplastic resin (a2) is, in a total amount of 100% by mass of all components contained in the film (a3), preferably 50% by mass to 99% by mass, more preferably 65% by mass to 98% by mass, and still more preferably 70% by mass to 92% by mass.

(Other Additives)

The film (a3) may contain other additives without impairing its preferred physical properties. Examples of the other additives include: a filler other than the above-mentioned reinforcing fibers (a1) and the above-mentioned spherical particles (a11), such as aramid fibers, polyphenylene benzoxazole (PBO) fibers, glass fibers, carbon fibers, alumina fibers, boron fibers, silicon carbide fibers, calcium carbonate, mica, sericite, illite, talc, kaolinite, montmorillonite, boehmite, smectite, vermiculite, titanium dioxide, potassium titanate, potassium lithium titanate or boehmite; a solid lubricant, such as polytetrafluoroethylene (PTFE), low-density polyethylene, linear low-density polyethylene, medium-density polyethylene, high-density polyethylene, ultra-high molecular weight polyethylene or other polyolefin resins, graphite, molybdenum disulfide, tungsten disulfide or boron nitride; a thermal stabilizer, such as copper compounds; a light stabilizer, such as hindered phenol-based light stabilizer; a nucleating agent; an antistat, such as anionic antistat, cationic antistat or non-ionic antistat; an anti-aging agent (antioxidant); a weatherproofer; a light-resistant agent; a metal deactivator; a ultraviolet ray absorber, such as benzophenone-based ultraviolet ray absorber, benzotriazole-based ultraviolet ray absorber, triazine-based ultraviolet ray absorber or salicylate-based ultraviolet ray absorber; a germ- and mildew-proofing agent; a deodorant; a conductive additive, such as carbon-based conductive additive, metal-based conductive additive, metal oxide-based conductive additive or surfactant; a dispersant; a softener (plasticizer), such as polyester-based plasticizer, glycerin-based plasticizer, polycarboxylic acid ester-based plasticizer, phosphoric acid ester-based plasticizer, polyalkylene glycol-based plasticizer or epoxy-based plasticizer; a colorant, such as carbon black, titanium oxide or other pigments, or dye; a flame retardant, such as phosphazene-based compound, phosphoric acid ester, condensed phosphoric acid ester, inorganic phosphorous flame retardant, halogen-based flame retardant, silicone-based flame retardant, metal oxide-based flame retardant, metal hydroxide-based flame retardant, organometallic salt-based flame retardant, nitrogen-based flame retardant or boron compound-based flame retardant; an antidripping agent; a sound deadener; a neutralizer; an antiblocking agent; a flow modifier; a mold release agent, such as fatty acid or metal salt of fatty acid; a lubricant, and an impact resistance improver. The film (a3) may contain at least one of these additives.

When the film (a3) contains the other additives, the content of them is not particularly limited without impairing the preferred physical properties of the present invention and is, in a total amount of 100% by mass of all components contained in the film (a3), preferably 5% by mass or less, and more preferably 1% by mass or less.

(Method for Producing a Layer)

The composite laminate according to the present invention can be obtained, as will be described hereinafter, by producing each of a film (a3) forming the A layer and a sheet (b3) forming the B layer, disposing the film (a3) on one or both sides of the sheet (b3) to form a layered stack of the film (a3) and the sheet (b3), and applying heat and pressure to the obtained stack with a molding machine to integrate the film (a3) and the sheet (b3).

There is no particular limitation as to the method for producing the film (a3) forming the A layer. For example, known melting and film formation methods, such as T-die casting, calendering, and pressing, can be used.

More specifically, examples include: a method of directly mixing the reinforcing fibers (a1), the spherical particles (a11), the thermoplastic resin (a2), and, if necessary, other additives to give the above respective contents and melting them to form a film; and a method of previously melt-kneading the reinforcing fibers (a1), the spherical particles (a11), the thermoplastic resin (a2), and, if necessary, other additives to give the above respective contents, forming pellets of the mixture, and using the pellets to melt them and form a film.

Either a stretched film or an unstretched film may be used as the film (3a), but the stretched film is preferred because its contraction during melting by the application of heat prevents the occurrence of wrinkling and loosening to further improve the appearance of a molded article. The stretch ratio is preferably 2 to 15. The stretch ratio in the present invention refers to the area ratio obtained by multiplying, with reference to the dimensions of a film exiting from a casting roll during film formation, its horizontal stretch ratio by its vertical stretch ratio.

The thickness of the film (a3) forming the A layer before the production of the composite laminate according to the present invention is preferably less than 500 µm, more preferably 30 µm to 450 µm, still more preferably 50 µm to 300 µm, and most preferably 100 µm to 200 µm. When the thickness of the film (a3) forming the A layer is less than 500 µm, the surface smoothness of the composite laminate obtained by stamping molding can be further increased without impairing the mechano-physical properties of the composite laminate.

<B Layer>

The B layer forming a component of the composite laminate according to the present invention is a layer formed of a sheet (b3) containing reinforcing fibers (b1) with an average fiber length of 1 mm or more and a thermoplastic resin (b2), and the B layer is a core layer of the composite laminate. When the average fiber length of the reinforcing fibers (b1) is 1 mm or more, a composite laminate having excellent mechano-physical properties can be obtained.

The thickness of the B layer can be arbitrarily selected depending on the shape of a desired member and is, in view of mechano-physical properties, preferably 0.3 mm to 15 mm, more preferably 1 mm to 10 mm, and still more preferably 1.5 mm to 5 mm.

(Reinforcing Fibers (b1))

There is no particular limitation as to the type of the reinforcing fibers (b1) for use in the sheet (b3) so long as their average fiber length is 1 mm or more, and examples that can be used include inorganic fibers, organic fibers, metallic fibers or any combination of two or more of these types of fibers. Examples of the inorganic fibers include carbon fibers, graphite fibers, silicon carbide fibers, alumina fibers, tungsten carbide fibers, boron fibers, and glass fibers. Examples of the organic fibers include aramid fibers, polyparaphenylene benzoxazole (PBO) fibers, high-density polyethylene fibers, other types of common polyamide fibers, and polyester. Examples of the metallic fibers include stainless fibers and iron fibers and metal-coated carbon fibers may also be used. Preferred among them are at least one type of fibers selected from the group consisting of carbon fibers, glass fibers, and aramid fibers. From the viewpoint of further increasing the mechano-physical properties, such as strength, of a final molded product, carbon fibers are more preferred. Carbon fibers are fibers produced by carbonizing acrylic fibers or pitch (aby-product of oil, coal, coal tar or the like) as a raw material at high temperatures and are defined in the Japanese Industrial Standards as fibers which are obtained by carbonizing a precursor of organic fibers by heat and 90% or more of the mass of which is made of carbon. Carbon fibers produced with the use of acrylic fibers are referred to as PAN-based carbon fibers, and carbon fibers produced with the use of pitch are referred to as pitch-based carbon fibers.

Regarding the reinforcing fibers (b1), an excessively long fiber length may decrease the fluidity during stamping molding, whereas an excessively short fiber length may make it difficult to skim the reinforcing fibers. Therefore, from the viewpoint of further increasing moldability, the reinforcing fibers (b1) are preferably non-continuous fibers and their average fiber length is more preferably 1 mm to 100 mm and still more preferably 2 mm to 50 mm. The average fiber diameter of the reinforcing fibers (b1) is preferably 1 µm to 50 µm and more preferably 5 µm to 20 µm. The reinforcing fibers (b1) may be in the form of bundles bundled with a sizing agent or the like so long as they have the above-mentioned average fiber diameter.

The content of the reinforcing fibers (b1) is, in a total amount of 100% by mass of all components contained in the sheet (b3), preferably 10% by mass to 80% by mass, more preferably 20% by mass to 70% by mass, and still more preferably 30% by mass to 60% by mass.

When the content of the reinforcing fibers (b1) is not less than 10% by mass, a further reinforcing effect of the fibers can be obtained. When the content of the reinforcing fibers (b1) is not more than 80% by mass, the productivity of a sheet to be described hereinafter can be further increased.

(Thermoplastic Resin (b2))

There is no particular limitation as to the type of the thermoplastic resin (b2) for use in the sheet (b3) so long as it is a thermoplastic resin that can be formed into fibers or a film. Examples include: polyolefin resins, such as polypropylene (PP) resin, polyethylene (PE) resin, cyclic polyolefin (COP) resin, and cyclic olefin copolymer (COC) resin; polystyrene-based resins, such as polystyrene (PS) resin, syndiotactic polystyrene (SPS) resin, high-impact polystyrene (HIPS) resin, acrylonitrile-butylene-styrene copolymer (ABS) resin, methyl methacrylate-styrene copolymer (MS), methyl methacrylate-styrene-butadiene copolymer (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (SEBS), and styrene-ethylene-propylene-styrene copolymer (SEPS); polyester-based resins, such as polylactic (PLA) resin, polyethylene terephthalate (PET) resin, polybutylene terephthalate (PBT) resin, and polycyclohexylenedimethylene terephthalate (PCT) resin; polyacetal (POM) resin; polycarbonate (PC) resin; aliphatic polyamide (PA) resins, such as polyamide 6 resin, polyamide 66 resin, polyamide 11 resin, polyamide 12 resin, polyamide 46 resin, polyamide 6C resin, polyamide 9C resin, polyamide 6 resin-polyamide 66 resin copolymer (polyamide 6/66 resin), and polyamide 6 resin-polyamide 12 resin copolymer (polyamide 6/12 resin); semi-aromatic polyamide (PA) resins composed of a structural unit with an aromatic ring and a structural unit free from aromatic ring, such as polyamide MXD6 resin, polyamide MXD10 resin, polyamide 6T resin, polyamide 9T resin, and polyamide 10T resin; polyphenylene sulfide (PPS) resin; polyether sulfone (PES) resin; liquid crystal polyester (LCP) resin; aromatic polyether ketone resins, such as polyether ketone (PEK) resin, polyether ether ketone (PEEK) resin, polyether ketone ketone (PEKK) resin, and polyether ether ketone ketone (PEEKK) resin; polyether imide (PEI) resin; polyamide-imide (PAI) resin; thermoplastic polyimide (TPI) resin; and fluororesins, such as polyvinylidene fluoride (PVDF), polyvinyl fluoride (PVF), and ethylene-tetrafluoroethylene copolymer (ETFE). Mixtures of at least two compatible thermoplastic resins selected from among the above thermoplastic resins, i.e., polymer alloys, or the like can also be used.

Among them, the preferred thermoplastic resin (b2) is at least one selected from the group consisting of polyolefin resin, polystyrene-based resin, polyester-based resin, aliphatic polyamide (PA) resin, semi-aromatic polyamide (PA) resin, polyphenylene sulfide (PPS) resin, polyether sulfone (PES) resin, aromatic polyether ketone resin, polyether imide (PEI) resin, and thermoplastic polyimide (TPI) resin.

There is no particular limitation as to the form of the thermoplastic resin (b2) so long as it can be melt-kneaded. For example, any one of powdered, granular, and pelletized forms can be used.

The content of the thermoplastic resin (b2) is, in a total amount of 100% by mass of all components contained in the sheet (b3), preferably 20% by mass to 90% by mass, more preferably 30% by mass to 80% by mass, and still more preferably 40% by mass to 70% by mass.

The weight per unit area of the sheet (b3) is preferably 100 g/m$^2$ to 1500 g/m$^2$ in view of smooth molding of a composite laminate according to the present invention.

(Method for Producing B Layer)

The composite laminate according to the present invention can be obtained by producing each of a film (a3) forming the A layer and a sheet (b3) forming the B layer, disposing the film (a3) on one or both sides of the sheet (b3) to form a layered stack of the film (a3) and the sheet (b3), and applying heat and pressure to the obtained stack with a molding machine to integrate the film (a3) and the sheet (b3).

The sheet (b3) forming the B layer can be obtained by stacking a plurality of prepregs made of the reinforcing fibers (b1) impregnated with the thermoplastic resin (b2) to give the above-mentioned respective contents, thus forming a stack, and applying heat and pressure to the obtained stack with a molding machine to integrate the prepregs. Alternatively, a prepreg made of the reinforcing fibers (b1) impregnated with the thermoplastic resin (b2) may be used as it are. In other words, a prepreg made of the reinforcing fibers (b1) impregnated with the thermoplastic resin (b2) may be used directly as the sheet (b3).

An example of a method for producing a prepreg is a method of preparing two sheets of thermoplastic resin (b2), such as films, pieces of non-woven fabric, mats, pieces of woven fabric or pieces of knit fabric, sandwiching between the two sheets a sheet made of reinforcing fibers (b1) aligned in a sheet from or a sheet obtained by cutting the reinforcing fibers (b2) and making them into a sheet (non-woven material) by a paper making method, and applying heat and pressure to the stacked sheets. More specifically, while two sheets of thermoplastic resin are fed from two rolls feeding different sheets of thermoplastic resin, a single sheet of reinforcing fibers fed from a roll for a sheet of reinforcing fibers is inserted between the two sheets of thermoplastic resin. Thereafter, heat and pressure are applied to the stack of the sheets. Any known apparatus for applying heat and pressure can be used and apparatuses requiring multiple stages may also be used, such as an apparatus using two or more hot rolls or an apparatus using a plurality of pairs of a preheating device and a hot roll. The thermoplastic resin forming each sheet may not necessarily be of a single type. One or more sheets of different types of thermoplastic resin may be further stacked using such an apparatus as described above.

Another example of a method for producing a prepreg is a method of blending reinforcing fibers (b1) obtained by spreading a bundle of reinforcing fibers (b1) with a fibrous thermoplastic resin (b2) at a desired mass ratio to form sheets, layering the sheets on top of each other to obtain a no-woven fabric, and then applying heat and pressure to the non-woven fabric. Any commercially available fiber blender can be used for the fiber blending. A carding method can be used for forming sheets and layering them and any commercially available carding machine can be used for the carding method. Any known apparatus for applying heat and pressure can be used. The average fiber length of the fibrous thermoplastic resin (b2) for use in producing a non-woven fabric may be approximately the same as that of the reinforcing fibers (b1) to be blended together and the fineness thereof is preferably 2.2 dtex to 22 dtex. When the fineness is 2.2 dtex to 22 dtex, the dispersibility of the reinforcing fibers (b1) and the fibrous thermoplastic resin (b2) can be improved, so that a more even non-woven fabric can be easily formed. Furthermore, from the viewpoint of further reducing a phenomenon where a sheet expands in a thickness direction during production of a green body using a prepreg, the number of scars in the prepreg by a needle puncher commonly used in fiber blending is preferably five or less per square centimeter. Moreover, the number of reinforcing fibers (b1) in each of which a portion is displaced 1 mm or more from another portion in the thickness direction of the prepreg in a cross-section of the prepreg is preferably 80 or less per square centimeter.

The temperature of heat applied is, depending on the type of the thermoplastic resin (b2), normally preferably 100° C. to 400° C. The pressure applied is normally preferably 0.1 MPa to 10 MPa. When the temperature and pressure applied are within the above ranges, this is preferred because the thermoplastic resin (b2) can further penetrate between the reinforcing fibers (b1) contained in the prepreg.

Regarding the prepreg containing the reinforcing fibers (b1) and the thermoplastic resin (b2), when the reinforcing fibers (b1) are continuous fibers oriented in a single direction, the prepreg that can be used for the composite laminate according to the present invention is preferably obtained by making incisions therein with a laser marker, a cutting plotter, a punching die or the like. The reinforcing fibers (b1) are cut by making the incisions, in which case, in view of mechano-physical properties and fluidity, the length of cut reinforcing fibers (b1) is preferably 5 mm to 100 mm and more preferably 10 mm to 50 mm.

A layered base material may be made by stacking the two or more prepregs obtained in the above manner so that the directions of the reinforcing fibers (b1) are quasi-isotropic or alternated. The layered base material is preferably obtained by stacking the prepregs in 4 to 96 layers. The more preferred range of prepreg layers is 8 to 32. The above range is preferred because eight or more prepreg layers enable provision of a stack in which the directions of reinforcing fibers are quasi-isotropic and because thirty-two or less prepreg layers enable further reduction in workload in the stacking process.

The sheet (b3) may be produced by applying heat and pressure to the layered base material obtained in the above manner to mold an integrated layered base material. In doing so, when the film (a3) is disposed between the layered base material and a mold of a press, a composite laminate according to the present invention can be produced concurrently with the production of the sheet (b3). After the heat application process, a cooling process is preferably performed. By the cooling, the thermoplastic resin is solidified, so that the sheet (b3) can be more easily handled.

During the application of heat, the layered base material is heated, depending on the type of the thermoplastic resin (b2) contained in the prepregs, preferably at 100° C. to 400° C. and more preferably at 150° C. to 350° C. In addition, prior to the application of heat, preheating may be performed. The preheating is normally performed at 150° C. to 400° C. and preferably at 200° C. to 380° C.

The pressure applied to the layered base material during the above application of pressure is preferably 0.1 MPa to 10 MPa and more preferably 0.2 MPa to 2 MPa. Each of these values of the pressure is a value obtained by dividing the pressing force by the area of the layered base material.

The time of application of heat and pressure is preferably 0.1 minutes to 30 minutes and more preferably 0.5 minutes to 20 minutes. The time of cooling set after the application of heat and pressure is preferably 0.5 minutes to 30 minutes.

The thickness of the sheet (b3) integrally formed by the above molding can be arbitrarily selected depending on the shape of a desired member and is, in view of moldability and mechano-physical properties, preferably 0.3 mm to 15 mm and more preferably 1 mm to 12 mm.

<Method for Producing Composite Laminate>

The composite laminate according to the present invention can be produced by disposing the film (a3) on one or both sides of the sheet (b3) to form a layered stack so that the film (a3) is disposed between the sheet (b3) and a mold, and applying heat and pressure to the obtained stack with a molding machine to integrate the film (a3) and the sheet (b3). Alternatively, two or more (preferably, two to five) films (a3) may be disposed on one or both sides of the sheet (b3) to form a layered stack. After the heat application process, a cooling process is preferably performed. By the cooling, the thermoplastic resin is solidified, so that the composite laminate can be easily handled.

During the application of heat to the stack, the stack is heated, depending on the type of the thermoplastic resin (a2) contained in the film (a3) and the type of the thermoplastic resin (b2) contained in the sheet (b3), preferably at 100° C. to 400° C. and more preferably at 150° C. to 350° C. In addition, prior to the application of heat, preheating may be performed. The preheating is normally performed at 150° C. to 400° C. and preferably at 200° C. to 380° C.

The pressure applied to the stack during the above application of pressure is preferably 0.1 MPa to 10 MPa and more preferably 0.2 MPa to 2 MPa. Each of these values of the pressure is a value obtained by dividing the pressing force by the area of the stack.

The time of application of heat and pressure is preferably 0.1 minutes to 30 minutes and more preferably 0.5 minutes to 20 minutes. The time of cooling set after the application of heat and pressure is preferably 0.5 minutes to 30 minutes.

The mold temperature (Th) of the molding machine during the application of heat is, if the thermoplastic resin contained in the stack has a melting point (Tm), preferably $Tm \leq Th \leq (Tm+100)$ (° C.) and more preferably $(Tm+10) \leq Th \leq (Tm+80)$ (° C.). The mold temperature (Th) of the molding machine during the application of heat is, if the thermoplastic resin contained in the stack has no melting point (Tm) but has a glass transition temperature (Tg), preferably $Tg \leq Th \leq (Tg+100)$ (° C.) and more preferably $(Tg+10) \leq Th \leq (Tg+80)$ (° C.). When the mold temperature (Th) of the molding machine is within the above range, the stack can be integrated while the expansion of the mold can be prevented and the deterioration of the resin can be reduced.

The difference (Th–Tc) between the mold temperature (Th) of the molding machine during application of heat and the mold temperature (Tc) thereof during cooling of the stack is preferably $10 \leq (Th-Tc) \leq 250$ (° C.) and more preferably $30 \leq (Th-Tc) \leq 200$ (° C.). When the difference between both the mold temperatures is within the above range, the thermoplastic resin can be more evenly melted and solidified, so that the obtained composite laminate can be further increased in durability.

A thermoplastic resin containing large-sized reinforcing fibers, as in the B layer of the composite laminate according to the present invention, generally develops sink marks by press molding. However, in the composite laminate according to the present invention, it can be considered that by forming the A layer containing the reinforcing fibers, which are microfibers, on the surface of the B layer, the reinforcing fibers (a1) fill and microreinforce the gaps between the reinforcing fibers (b1), thus increasing the surface smoothness and mechano-physical properties.

In the composite laminate according to the present invention, it can also be considered that effects obtained by forming the A layer containing the reinforcing fibers (a1) on the surface of the composite laminate, including the nucleating effect of the reinforcing fibers (a1) on the thermoplastic resin (a2), reduced sticking of the reinforcing fibers (a1) to the mold, and increased high-temperature rigidity due to the reinforcing fibers (a1), increase the releasability from the mold.

Since the A layer containing the reinforcing fibers (a1) is formed on the surface of the composite laminate according to the present invention, the composite laminate has an effect that burrs are less likely to be formed on a cut surface thereof after being subjected to a cutting process.

Since the A layer containing the reinforcing fibers (a1) is formed on the surface of the composite laminate according to the present invention, the existence of hydroxyl groups or the like on the surfaces of the reinforcing fibers (a1) increases the adhesion of coating to the composite laminate. Furthermore, although non-fibrous materials are known to be less effective in increasing the mechano-physical properties than fibrous materials, the composite laminate according to the present invention can further increase the coating adhesion, without decreasing the mechano-physical properties, by replacing some of the reinforcing fibers (a1) with the spherical particles (a11).

In the composite laminate according to the present invention, it can be expected that the tanglement (anchoring effect) between the reinforcing fibers (a1) in the A layer and the reinforcing fibers (b1) in the B layer increases the adhesion strength between the A layer and the B layer.

As seen from the above features, the composite laminate according to the present invention can be used as a preform for molding that can be given an arbitrary shape by press molding, such as stamping molding and, therefore, can be given the shapes of various parts, components, and members of motor vehicles, electric and electronic devices (such as a personal computer housing and a tablet computer), and so on.

EXAMPLES

Hereinafter, a detailed description will be given of the present invention with reference to working examples and comparative examples, but the present invention is not at all limited to these examples. Specific raw materials used in the working examples and comparative examples are as follows.
(Reinforcing Fibers (a1))
Potassium titanate (trade name: TISMO D101 manufactured by Otsuka Chemical Co., Ltd., average fiber length: 15 μm, average fiber diameter: 0.5 μm, average aspect ratio: 30)
Wollastonite (trade name: Bistal W manufactured by Otsuka Chemical Co., Ltd., average fiber length: 25 μm, average fiber diameter: 3 μm, average aspect ratio: 8).
(Spherical Particles (a11))
Spherical Silica (trade name: SC2500-SEJ manufactured by Admatechs Company Limited, amorphous silica, spherical particles, volume mean particle diameter: 0.6 μm, specific surface area: 6.0 $m^2/g$, surface treatment agent: 3-glycidoxypropyltrimethoxysilane)
(Thermoplastic Resin (a2))
Polyamide MXD10 resin (trade name: LEXTER 8500 manufactured by Mitsubishi Gas Chemical Company, Inc.)
Polyamide 6 resin (trade name: AMILAN CM1017 manufactured by Toray Industries, Inc.)
(Others)
Platy talc (trade name: TALC GH7 manufactured by Hayashi Kasei Co., Ltd., average major diameter: 5.8 μm, thickness: 0.1 μm)
Glass fibers (trade name: ECS 03T-289P/W manufactured by Nippon Electric Glass Co., Ltd., average fiber length: 3 mm, average fiber diameter: 13 μm)

Test Example 1 to Test Example 7

Materials were melt-kneaded in each composition ratio shown in Table 1 using a biaxial extruder, thus producing pellets. The cylinder temperature of the biaxial extruder was 240° C. in Test Examples 1 to 5 and 230° C. in Test Examples 6 and 7.

The obtained pellets were injection molded to make a JIS test piece (bending test piece). The cylinder temperature of the injection molder was 240° C. and the mold temperature was 110° C. in Test Examples 1 to 5 and 85° C. in Test Examples 6 and 7. The made bending test pieces were subjected to a 60 mm-span three-point bending test with a tester Autograph AG-5000 (manufactured by Shimadzu Corporation) in conformity with JIS K7171 to measure their flexural strengths and flexural moduli of elasticity. The results are shown in Table 1.

The obtained pellets were dried, then melted in a film extruder (manufactured by Toyo Seiki Seisaku-sho, Ltd., a connection of LABO PLASTOMILL 4C150-01 with a uniaxial extruder D2020 (L/D=20)) at a cylinder temperature of 240° C. in Test Examples 1 to 5 and 230° C. in Test Examples 6 and 7, and extruded as a molten resin from a T-die (width: 150 mm, thickness: 0.2 mm), and the extruded molten resin was uniaxially stretched through a film drawer so that a resultant film had a desired thickness, thus obtaining a film. The thickness of the films was set at 100 μm.

TABLE 1

| | | | Test Ex. 1 | Test Ex. 2 | Test Ex. 3 | Test Ex. 4 | Test Ex. 5 | Test Ex. 6 | Test Ex. 7 |
|---|---|---|---|---|---|---|---|---|---|
| Content of Compounding Ingredient (% by mass) | Reinforcing fibers (a1) | Potassium titanate fibers | 10 | | 15 | | | | |
| | | Wollastonite fibers | | 10 | | 15 | | | |
| | Spherical particles (a11) | Spherical silica | 5 | 5 | | | | | |
| | Thermoplastic resin (a2) | Polyamide MXD10 resin | 85 | 85 | 85 | 85 | 100 | | |
| | | Polyamide 6 resin | | | | | | 90 | 90 |
| | Others | Platy talc | | | | | | 10 | |
| | | Glass fibers | | | | | | | 10 |
| Mechano-Physical Properties | | Flexural strength (MPa) | 162 | 146 | 172 | 154 | 111 | 106 | 129 |
| | | Flexural modulus (GPa) | 4.6 | 4.2 | 5.1 | 4.7 | 2.5 | 3.4 | 4.1 |

Example 1, Example 2, Comparative Example 1 to Comparative Example 4

(Mold Releasability)

For each of the above-obtained films in Test Examples 1 to 5, three films, 10 carbon fiber sheets (sheet thickness: 3 mm, content of carbon fibers: 51% by mass) made of carbon fibers (average fiber length: 70 mm, average fiber diameter: 7 μm) impregnated with polyamide 6 resin, three films, and a metallic plate (steel SS400, 600-grit finished) were stacked in this order on a metallic plate (steel SS400, 2000-grit finished), and the stack was pressed with a pressing machine (manufactured by Hoden Seimitsu Kako Kenkyusho Co., Ltd., trade name: ZENFormer 75t, double slide machine) under conditions of a top plate temperature of 270° C., a preheating time of 15 minutes, a pressure of 7 MPa, and a pressing time of one minute. After the pressing, the stack was cooled to room temperature and the top plate was lifted up to peel off the stack from the metallic plate. As Comparative Example 4, a stack pressed under the same conditions except that no film was inserted was used.

The composite laminate completely peeled off from the metallic plate (steel SS400, 2000-grit finished) was evaluated as grade "A", the composite laminate partly left on the metallic plate was evaluated as grade "B", and the composite laminate not peeled off from the metallic plate was evaluated as grade "C". The results are shown in Table 2.

(Evaluation of Maximum Height (Sz))

For each of the above-obtained films in Test Examples 1 to 5, two films and a carbon fiber sheet (sheet thickness: 3 mm, content of carbon fibers: 51% by mass) made of carbon fibers (average fiber length: 70 mm, average fiber diameter: 7 μm) impregnated with polyamide 6 resin were clamped in a pressing machine (manufactured by Hoden Seimitsu Kako Kenkyusho Co., Ltd., trade name: ZENFormer 75t, double slide machine) to have a structure of the film/the carbon fiber sheet/the film and pressed with the pressing machine under conditions of a top plate temperature of 270° C., a preheating time of 15 minutes, a pressure of 7 MPa, and a pressing time of one minute. After the pressing, the stack was cooled to room temperature and the top plate was lifted up to peel off the stack from the metallic plate, thus producing a composite laminate. The total thickness of the A layer of the obtained composite laminate was 163 μm and the thickness of the B layer thereof was 1.81 mm. As Comparative Example 4, a stack pressed under the same conditions except that no film was inserted was used.

The surface (A layer side) of the obtained composite laminate was measured in terms of its maximum height (Sz) in conformity with ISO 25178 using a laser microscope (manufactured by Keyence Corporation, trade name: VK-X250). The composite laminate having a maximum height (Sz) of less than 70 μm was evaluated as grade "A", the composite laminate having a maximum height (Sz) of not less than 70 μm and less than 100 μm was evaluated as grade "B", and the composite laminate having a maximum height (Sz) of not less than 100 μm was evaluated as grade "C". The results are shown in Table 2.

(Machinability)

The composite laminates used for the evaluation of the maximum heights (Sz) were cut into a shape of 90 mm long and 50 mm wide (flat plate) by an abrasive waterjet cutter. The cutting conditions were as follows: a nozzle diameter φ of 0.76 mm, a water pressure of 400 MPa, a cutting speed of 200 mm/min, an amount of water of about 2.5 L/min, and an amount of abrasive (garnet #80) used of 400 g/min.

The composite laminates were evaluated in terms of the degree of development of burrs from their cut surfaces after the cutting process: the composite laminate on which no burr was found was evaluated as grade "A", the composite laminate on which small burrs (burrs easily removable by hand) were found was evaluated as grade "B", and the composite laminate on which large burrs (burrs removable only with a tool) were found was evaluated as grade "C". The results of the evaluations are shown in Table 2.

(Coating Adhesion)

The composite laminates used for the evaluation of the maximum heights (Sz) were cut into a shape of 90 mm long and 50 mm wide (flat plate) by an abrasive waterjet cutter. The cutting conditions were as follows: a nozzle diameter φ of 0.76 mm, a water pressure of 400 MPa, a cutting speed of 200 mm/min, an amount of water of about 2.5 L/min, and an amount of abrasive (garnet #80) used of 400 g/min.

The surfaces of the obtained flat plates were degreased with a solvent and then coated with a two-pack acrylic urethane-based paint (manufactured by Fujikura Kasei Co., Ltd., trade name: RECRACK #110) to have a coating thickness of 18 μm and the coated surfaces were further coated with a clear coating to have a coating thickness of 13 μm. After the coating, the flat plates were subjected to a cutting test with a cutter. The groove widths of the cut portions were measured. The flat plate having a groove width of less than 30 μm was evaluated as grade "A", the flat plate having a groove width of not less than 30 μm and less than 50 μm was evaluated as grade "B", the flat plate having a groove width of not less than 50 μm and less than 80 μm was evaluated as grade "C", and the flat plate having a groove width of not less than 80 μm was evaluated as grade "D". The results are shown in Table 2.

(Mechano-Physical Properties)

The composite laminates used for the evaluation of the maximum heights (Sz) were cut into a shape of a JIS test piece (bending test piece) by an abrasive waterjet cutter. The cutting conditions were as follows: a nozzle diameter φ of 0.76 mm, a water pressure of 400 MPa, a cutting speed of 200 mm/min, an amount of water of about 2.5 L/min, and an amount of abrasive (garnet #80) used of 400 g/min. The cutting was performed so that the lengthwise direction of the bending test piece coincided with the direction of drawing of films in Test Examples 1 to 5.

The obtained bending test pieces were subjected to a 60 mm-span three-point bending test with a tester Autograph AG-5000 (manufactured by Shimadzu Corporation) in conformity with JIS K7171 to measure their flexural strengths and flexural moduli of elasticity. The results are shown in Table 2.

TABLE 2

| | | | | Ex. 1 | Ex. 2 | Comp. Ex. 1 | Comp. Ex. 2 | Comp. Ex. 3 | Comp. Ex. 4 |
|---|---|---|---|---|---|---|---|---|---|
| A Layer | Material Film | | | Test Ex. 1 | Test Ex. 2 | Test Ex. 3 | Test Ex. 4 | Test Ex. 5 | — |
| | Content of Compounding | Reinforcing fibers (a1) | Potassium titanate fibers | 10 | | 15 | | | |
| | | | Wollastonite fibers | | 10 | | 15 | | |

TABLE 2-continued

|  |  |  | Ex. 1 | Ex. 2 | Comp. Ex. 1 | Comp. Ex. 2 | Comp. Ex. 3 | Comp. Ex. 4 |
|---|---|---|---|---|---|---|---|---|
| Ingredient (% by mass) | Spherical particles (a11) | Spherical silica | 5 | 5 |  |  |  |  |
|  | Thermoplasic resin (a2) | Polamide MXD10 resin | 85 | 85 | 85 | 85 | 100 |  |
|  | Others | Platy talc |  |  |  |  |  |  |
|  |  | Glass fibers |  |  |  |  |  |  |
| B Layer Content of Compounding Ingredient (% by mass) | Reinforcing fibers (b1) | Carbon fibers | 51 | 51 | 51 | 51 | 51 | 51 |
|  | Thermoplastic resin (b2) | PA 6 resin | 49 | 49 | 49 | 49 | 49 | 49 |
| Mold Releasability |  |  | A | B | A | B | C | C |
| Maximum Height Sz |  |  | A | A | A | A | B | C |
| Machinability |  |  | A | B | A | B | C | C |
| Coating Adhesion |  |  | A | B | C | C | D | D |
| Mechano-Physical Properties | Flexural strength (MPa) |  | 316 | 274 | 310 | 274 | 257 | 255 |
|  | Flexural modulus (GPa) |  | 13.5 | 11.7 | 13.1 | 11.3 | 10.9 | 10.4 |

Comparative Example 5 and Comparative Example 6

(Mold Releasability)

For each of the above-obtained films in Test Examples 6 and 7, the film, a carbon fiber sheet (sheet thickness: 10 mm, content of carbon fibers: 50% by mass) made of carbon fibers (average fiber length: 30 mm, average fiber diameter: 7 μm) impregnated with polyamide 6 resin, and an imide film (trade name: UPILEX 75S manufactured by Ube Industries, Ltd.) were stacked in this order on a metallic plate (steel SS400), and the stack was pressed with a pressing machine (manufactured by Toyo Seiki Seisaku-sho, Ltd., trade name: Mini Test Press MP-WCH) under conditions of a top plate temperature of 220° C., a preheating time of one minute, a pressure of 2 MPa, and a pressing time of one minute. After the pressing, the imide film was pulled up 90° above the metallic plate to peel off the imide film from the metallic plate. Upon peeling of the imide film, the composite laminate completely peeled off from the metallic plate together with the imide film was evaluated as grade "A", the composite laminate partly left on the metallic plate was evaluated as grade "B", and the composite laminate in which the composite laminate itself was not peeled off from the metallic plate but only the imide film was peeled off was evaluated as grade "C". The results are shown in Table 3.

(Evaluation of Maximum Height (Sz))

For each of the above-obtained films in Test Examples 6 and 7, the film and a carbon fiber sheet (sheet thickness: 10 mm, content of carbon fibers: 50% by mass) made of carbon fibers (average fiber length: 30 mm, average fiber diameter: 7 μm) impregnated with polyamide 6 resin were sandwiched between two imide films (trade name: UPILEX 75S manufactured by Ube Industries, Ltd.) to have a structure of the film/the carbon fiber sheet, the sandwich structure was pressed with a pressing machine (manufactured by Toyo Seiki Seisaku-sho, Ltd., trade name: Mini Test Press MP-WCH) under conditions of a top plate temperature of 220° C., a preheating time of one minute, a pressure of 2 MPa, and a pressing time of one minute, and the imide films were peeled off after the pressing, thus producing a composite laminate. The total thickness of the A layer of the obtained composite laminate was 65 μm and the thickness of the B layer thereof was 0.375 mm. The surface (A layer side) of the obtained composite laminate was measured in terms of its maximum height (Sz) in conformity with ISO 25178 using a laser microscope (manufactured by Keyence Corporation, trade name: VK-X250). The composite laminate having a maximum height (Sz) of less than 70 μm was evaluated as grade "A", the composite laminate having a maximum height (Sz) of not less than 70 μm and less than 100 μm was evaluated as grade "B", and the composite laminate having a maximum height (Sz) of not less than 100 μm was evaluated as grade "C". The results are shown in Table 3.

TABLE 3

|  |  |  |  | Comp.Ex. 5 | Comp.Ex. 6 |
|---|---|---|---|---|---|
| A Layer |  | Material Film |  | Test Ex. 6 | Test Ex. 7 |
|  | Compounding Ingredient (% by mass) | Reinforcing fibers (a1) | Potassium titanate fibers |  |  |
|  |  |  | Wollastonite fibers |  |  |
|  |  | Spherical particles (a11) | Spherical silica |  |  |
|  |  | Thermoplastic resin (a2) | Polyamide 6 resin | 90 | 90 |
|  |  | Others | Platy talc | 10 |  |
|  |  |  | Glass fibers |  | 10 |
| B Layer | Compounding Ingredient (% by mass) | Reinforcing fibers (b1) | Carbon fibers | 50 | 50 |
|  |  | Reinforcing fibers (b2) | Polyamide 6 resin | 50 | 50 |
|  |  | Mold Releasability |  | A | C |
|  |  | Maximum Height Sz |  | C | A |

It can be seen from Test Example 3 having the same composition as a structure formed only of the A layer that potassium titanate fibers increase the mechano-physical properties, but the structure formed only of the A layer had lower mechano-physical properties than Comparative Example 4 having a structure formed only of the B layer. Furthermore, since the total thickness of the A layer is as extremely small as 1/10 or less of the thickness of the B layer, it can be expected that the A layer does not contribute to an improvement in the mechano-physical properties of the composite laminate. However, Comparative Example 1 which was a composite laminate formed of the A layer containing potassium titanate fibers and the B layer exhibited increased mechano-physical properties as compared to Comparative Example 3 which was a composite laminate formed of the A layer containing no potassium titanate fibers and the B layer. Moreover, when some of potassium titanate fibers in Test Example 1 having the same composition as a structure formed only of the A layer were replaced with spherical silica, the mechano-physical properties decreased. However, it was found that a composite laminate of Example 1 in which the film of Test Example 1 was used as the A layer achieved an unexpected effect that the mechano-physical properties increased as compared to Comparative Example 1.

REFERENCE SIGNS LIST 1, 21 . . . composite laminate
2 . . . A layer
3 . . . B layer
3a . . . first principal surface
3b . . . second principal surface

The invention claimed is:

1. A composite laminate comprising an A layer and a B layer, the A layer being provided directly or indirectly on one or both sides of the B layer, the A layer containing reinforcing fibers (a1) with an average fiber length of 1 µm to 300 µm, spherical particles (a11) with a volume mean particle diameter of 0.01 µm to 100 µm, and a thermoplastic resin (a2), the B layer containing reinforcing fibers (b1) with an average fiber length of 1 mm or more and a thermoplastic resin (b2), wherein the reinforcing fibers (a1) are at least one of potassium titanate and wollastonite, and the spherical particles (a11) are at least one material selected from the group consisting of silica and alumina.

2. The composite laminate according to claim 1, wherein the thermoplastic resin (a2) is at least one selected from the group consisting of polyolefin resin, polystyrene-based resin, polyester-based resin, aliphatic polyamide resin, semi-aromatic polyamide resin, polyphenylene sulfide resin, polyether sulfone resin, aromatic polyether ketone resin, polyetherimide resin, and thermoplastic polyimide resin.

3. The composite laminate according to claim 1, wherein a content of the reinforcing fibers (a1) is 0.5% by mass to 30% by mass in a total amount of 100% by mass of all components contained in the A layer.

4. The composite laminate according to claim 1, wherein a content of the spherical particles (a11) is 0.5% by mass to 20% by mass in a total amount of 100% by mass of all components contained in the A layer.

5. The composite laminate according to claim 1, wherein the A layer has a thickness of less than 500 µm.

6. The composite laminate according to claim 1, wherein the reinforcing fibers (b1) are at least one type of fibers selected from the group consisting of carbon fibers, glass fibers, and aramid fibers.

7. The composite laminate according to claim 1, wherein a content of the reinforcing fibers (b1) is 10% by mass to 80% by mass in a total amount of 100% by mass of all components contained in the B layer.

8. The composite laminate according to claim 1, wherein the thermoplastic resin (b2) is at least one selected from the group consisting of polyolefin resin, polystyrene-based resin, polyester-based resin, aliphatic polyamide resin, semi-aromatic polyamide resin, polyphenylene sulfide resin, polyether sulfone resin, aromatic polyether ketone resin, polyetherimide resin, and thermoplastic polyimide resin.

9. The composite laminate according to claim 1, wherein the B layer has a thickness of 0.3 mm or more.

10. The composite laminate according to claim 1, being used for motor vehicle members or electric and electronic components.

11. A method for producing the composite laminate according to claim 1, the method comprising:
disposing a film (a3) containing reinforcing fibers (a1) with an average fiber length of 1 µm to 300 µm, spherical particles (a11) with a volume mean particle diameter of 0.01 µm to 100 µm, and a thermoplastic resin (a2) on one or both sides of a sheet (b3) containing reinforcing fibers (b1) with an average fiber length of 1 mm or more and a thermoplastic resin (b2) to form a layered stack of the film (a3) and the sheet (b3); and
applying heat and pressure to the layered stack to integrate the sheet (b3) and the film (a3).

* * * * *